US005636560A

United States Patent [19]

Paul

[11] Patent Number: 5,636,560

[45] Date of Patent: Jun. 10, 1997

[54] METHOD AND APPARATUS FOR FACILITATING THE REMOVAL OF GOLF GRIPS

[75] Inventor: Carl F. Paul, Austin, Tex.

[73] Assignee: Golfsmith International, Inc., Austin, Tex.

[21] Appl. No.: 388,598

[22] Filed: Feb. 14, 1995

[51] Int. Cl.[6] ..................... B62D 3/28

[52] U.S. Cl. ..................... 83/861; 83/444; 83/856; 30/90.4

[58] Field of Search ..................... 83/196, 284, 652, 83/856, 444, 446, 861; 30/92.5, 90.4

[56] References Cited

U.S. PATENT DOCUMENTS

| | | | |
|---|---|---|---|
| D. 255,642 | 7/1980 | Erpenbeck et al. | D8/60 |
| D. 297,910 | 10/1988 | Mathews | D8/98 |
| D. 301,970 | 7/1989 | Matthews | D8/98 |
| D. 355,577 | 2/1995 | Gafner et al. | D8/98 |
| 2,149,935 | 7/1939 | Chambless | 130/31 |
| 2,329,805 | 9/1943 | Wilson, Sr. | 30/92.5 X |
| 2,559,387 | 7/1951 | Baker | 30/90.4 X |
| 2,761,211 | 9/1956 | Grant | 30/91 |
| 3,683,892 | 8/1972 | Harris | 128/2 B |
| 3,988,826 | 11/1976 | Heikkala | 30/90.4 X |
| 4,198,751 | 4/1980 | Egbert | 30/90.4 X |
| 4,399,726 | 8/1983 | Zacuto | 83/856 X |
| 4,536,957 | 8/1985 | Britton | 30/90.4 |
| 4,631,059 | 12/1986 | Wolvek et al. | 30/90.4 X |
| 4,951,393 | 8/1990 | Wallace | 30/90.4 |
| 4,977,671 | 12/1990 | Ducret | 30/92.5 X |
| 4,979,413 | 12/1990 | Beller | 83/444 X |
| 5,020,221 | 6/1991 | Nelson | 30/169 |
| 5,050,302 | 9/1991 | Mills | 30/90.4 X |
| 5,085,114 | 2/1992 | DeRoss et al. | 83/861 X |
| 5,123,646 | 6/1992 | Overby et al. | 273/81.2 |
| 5,235,751 | 8/1993 | Landgraf | 30/169 |
| 5,471,748 | 12/1995 | Provost | 30/289 X |

FOREIGN PATENT DOCUMENTS

| | | | |
|---|---|---|---|
| 460344 | 1/1949 | Canada . | |
| 0 332 730 | 9/1989 | European Pat. Off. | A01G 5/00 |
| 3244490 | 10/1991 | Japan . | |

OTHER PUBLICATIONS

Golfsmith® Clubhead & Components Catalog, 1994.

*Primary Examiner*—Rinaldi I. Rada
*Assistant Examiner*—Boyer Ashley
*Attorney, Agent, or Firm*—Arnold, White & Durkee

[57] ABSTRACT

A novel method and apparatus for cutting a slit in the grip of a golf club to facilitate the removal of a golf grip from a golf club is disclosed. The disclosed grip removing device includes a mountable base having a club receiving portion and a back portion; a cutting member secured to the mountable base proximate the club receiving portion of the mountable base; and an alignment member movably secured to the back end of the mountable base. The disclosed method includes inserting a butt end of a golf club into the grip receiving portion of the grip removing device, positioning the cutting member to engage the grip, and pulling the butt end of the golf club from the grip receiving portion of the grip removing device to slit the grip along a longitudinal line to facilitate removal of the grip from the shaft. The inserting step may further include inserting the butt end of the golf club into an alignment member and moving the golf club within the alignment member relative to the base of the grip removing device to position the butt end of the club proximate to the cutting member.

12 Claims, 1 Drawing Sheet

METHOD AND APPARATUS FOR FACILITATING THE REMOVAL OF GOLF GRIPS

BACKGROUND OF THE INVENTION

1. Field of Invention

The present invention relates to the removal of grips from handles or shafts. More particularly, the present invention relates to an apparatus and method for facilitating the removal of a golf grip from its associated golf club shaft.

2. Description of the Prior Art

Hand grips are used for a variety of devices, including sporting goods equipment. Used and/or worn grips, particularly in the golf field, present problems during the removal process. As basic components, a golf club includes a club head, a shaft and a grip. A golf shaft is generally a hollow tube that is tapered from its butt end to its tip. The club head is attached to the tapered tip of the golf shaft and provides the ball striking surface. A golf grip is attached to the "fat" butt end of the club that exhibits a more or less constant diameter and provides the handle for the golfer's hands.

A grip is generally a rubber sheath that fits around the butt end of the shaft. To attach a grip to the shaft of the golf club, the shaft is usually first wrapped with double-sided tape over a length of the shaft equivalent to the length of the grip. A solvent is then used to dissolve and lubricate the adhesive on the outside of the double-sided tape and lubricate the internal portion of the grip. Finally, the grip is slid into place over the double-sided tape at the butt end of the club. Once the solvent dries and the adhesive sets again, the grip should not move so that the position of the grip on the shaft remains constant.

When one desires to remove a grip from a golf club, e.g., to regrip the golf club, the old grip must be separated from the double-sided tape. One technique for removing a grip is to cut a longitudinal slit in the grip with the tip of a knife blade, razor blade or other cutting utensil (referred to herein as the "slit technique"). Once the grip has been cut along its length, the grip may be peeled away from the double-sided tape. The double-sided tape may then be removed to expose the original, ungripped shaft.

A different technique for removing a grip is to strip a section of the grip off the shaft using the broad face of a horizontally positioned razor blade (referred to herein as the "strip technique"). Once the strip is removed, the rest of grip may be pulled away from the double-sided tape.

If the shaft is made of some sort of fibre, as opposed to steel, and penetration of the blade into the grip during a removal process is too deep, the cutting tool may score and thereby damage the underlying shaft of the golf club. Particularly, with graphite fibre shafts, this scoring may lead to subsequent, undesirable fractures of the shaft during use. Such a fracture necessarily leads to an expensive replacement of the golf club shaft.

An additional disadvantage of most previously known devices is that they use nonstationary or hand-held blades, which exposes the person removing the grip to the danger of minor cuts to severe lacerations if a blade or club slips during cutting.

One prior device provides a horizontally positioned razor blade that is adapted to the strip technique. In use, this prior art device is held in place by a vise, while the grip of a club is pulled against the broad face of the razor blade to strip a section of the grip down the full length of the grip. However, it is believed that this device requires greater force to effect the cut (than is used for the slit technique) because the blade must essentially cut through more of the grip to actually remove a strip of finite width. In turn, requirement of greater force increases the possibility that the application of such force could bend, break, or otherwise harm a club. It is therefore desirable to provide a device that requires less effort in handling.

In turn, the fact that the blade encounters more of the grip increases the likelihood that the blade might become dull and increases the need to repeatedly sharpen or replace the blade to maintain performance of the device. Absent such measures, such previously known devices might quickly deteriorate in use.

By the same token, while there exist devices that utilize the slit technique, it is believed that such devices fail to provide a means to maintain a constant orientation of the blade relative to the grip and shaft. The provision of such consistent orientation is desirable to enhance cutting efficiency and consistency. In turn, such efficiency and consistency is desirable both for providing consistent quality of grip replacement and for minimizing club damage or injury to those performing the grip replacement.

Thus, a device is needed to facilitate the removal of a grip from the shaft of a golf club without the associated problems of damage to the shaft or injury to the operator.

SUMMARY OF THE INVENTION

The present invention addresses the problems discussed above by providing a relatively simple and effective grip removing device that facilitates the removal of golf grips. The grip removing device includes a mountable base that is adapted to be secured to a work surface. A cutting member is secured to the mountable base, and is positioned such that the cutting member has a cutting surface that extends upwardly and is substantially perpendicularly disposed to the golf club in use. The cutting member may comprise a blade having a grip-engaging hook or lip. Specifically, it may have a noncutting top surface and a lateral cutting surface that are configured to define a guide-tip for receiving the lip of a grip in use. The cutting member may further be positioned to be in an offset alignment with the center-line of the golf shaft in use so that the blade will not be positioned exactly perpendicularly to the grip (and shaft) in use, thereby lessening the possibility that the blade will deeply score a golf shaft in use.

The grip removing device may further include an alignment member secured to the base and adapted to receive and guide a golf club shaft in a selected path relative to the cutting member in use. The alignment member may be movably mounted to the back portion of the mountable base in order to provide alignment and guidance for a golf shaft when the invention is used. In a preferred embodiment, the alignment member comprises a cylindrical, club-receiving sheath appropriately sized to receive and guide a golf shaft in use. This sheath may include a blade receiving slit, if the sheath is adapted to extend over the blade. Further, the cylindrical, club-receiving sheath may be securable to a work surface to provide constant alignment for use of the invention.

The present invention also contemplates a method for facilitating the removal of a grip from a golf club having a butt end including a grip coupled to a shaft. The method includes the steps of inserting a butt end of a golf club into a grip receiving portion of a grip removing device; engaging the grip with a substantially perpendicularly oriented cutting member of said grip removing device; and pulling the butt end of the golf club from the grip receiving end of the grip removing device to slit the grip along a longitudinal line to accommodate removal of the grip from the shaft. In a further embodiment, the grip removing device includes a movably mounted alignment member, and the method is characterized in the inserting step by inserting the butt end of the golf club into such a alignment member and moving the alignment member into a cutting position to position the butt end of the club proximate the cutting member to engage the grip with the cutting member.

Accordingly, the present invention provides a device that enables the use of the slit technique to remove a grip while also providing a means to consistently align a golf club in the device for consistent performance and operation. Because the cutting member cuts only a single groove or slit in the grip (rather than an entire section from the grip) the resistance to cutting is less, and it is believed the life of the blade will be enhanced over that encountered for blades used in devices using the strip technique.

These advantages and features of the present invention may be better understood by reference to the following description and appended drawings, which form a part of this specification.

BRIEF DESCRIPTION OF THE DRAWINGS

It should be noted that the appended drawings illustrate only particular embodiments of the invention and are, therefore, not to be considered limiting of its scope, for the invention may admit to other effective embodiments.

DETAILED DESCRIPTION

Figure 1:
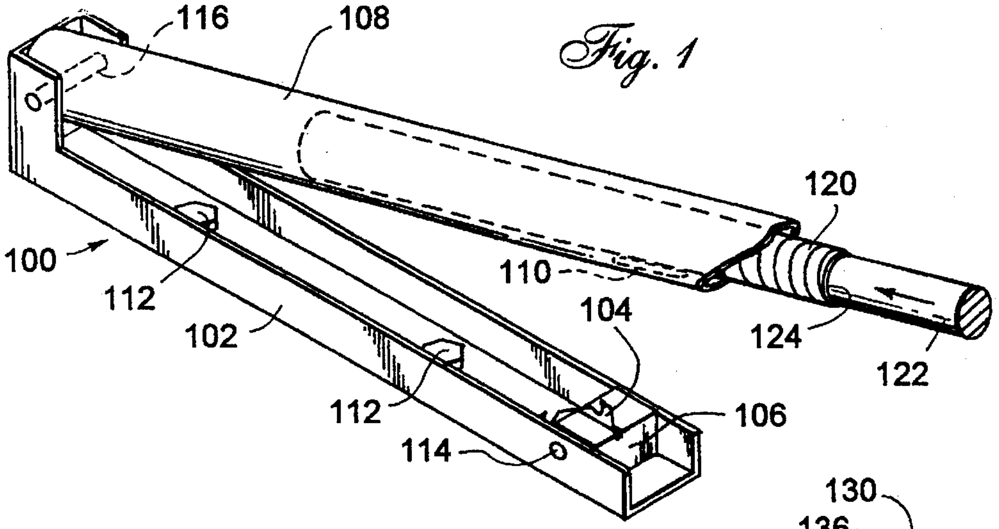
FIG. 1 is a top, right perspective view of a grip removing device according to the present invention with the sheath in a raised position.

Referring first to FIG. 1, there is shown a top, right perspective view of a grip removing device 100 according to the present invention. The grip removing device 100 generally includes a mountable base 102, a cutting member or blade 104, and an alignment member 108. The base 102 may have any of a number of configurations adapted to support cutting member 104 in a selected orientation, while providing a stable, secure base for the cutting member 104. The base 102 is further adapted to be secured or mounted to a work surface such as a table, work bench or similar surface by suitable fasteners, such as the hex-head bolts 112 shown in FIG. 1, or removable clamps (not shown) if transportability of the device is desired. By so securing the grip removing device 100 to a work surface, the user may eliminate the need (that exists with many devices) for holding the cutting member, and gain the advantage of using a work surface to provide the opposing force on the cutting member 104.

Figure 2:
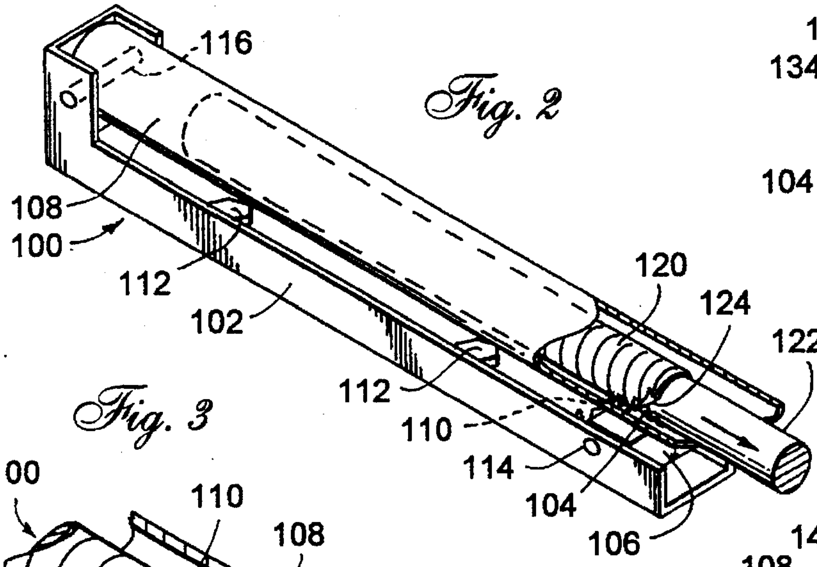
FIG. 2 is a top, right perspective view of a grip removing device according to the present invention with the sheath in a lowered position.

The grip removing device 100 further includes a cutting member 104, that is removably secured to the base 102 to provide a selected alignment and orientation for the cutting member 104. The cutting member 104 may be secured to the base 102 in a number of suitable manners that will be apparent to those of skill in the art from the present disclosure. In the illustrated embodiment, the base 102 comprises channel-shaped member, as best seen in FIG. 1 and FIG. 2. The base further includes a receiving plate or fixing plate 106 that is sized complementary to the inner dimensions of the channel of the base 102 such that the receiving plate 106 is snugly received within the channel. The receiving plate 106 has a receiving slit having a position and configuration that is adapted to provide the desired position and orientation for the cutting member 104 when the cutting member 104 is positioned within the slit of the receiving plate 106.

The cutting member 104, receiving plate 106 and base 102 further have an aligned aperture passing there through such that the three members may be held together by use of a suitable fastener, such as retaining screw 114, as best shown in FIG. 1. In this manner, the cutting member 104 may be securely fixed so that the cutting member 104 has the desired angle of orientation and alignment for use of the grip removing device 100 of the present invention.

Figure 4:
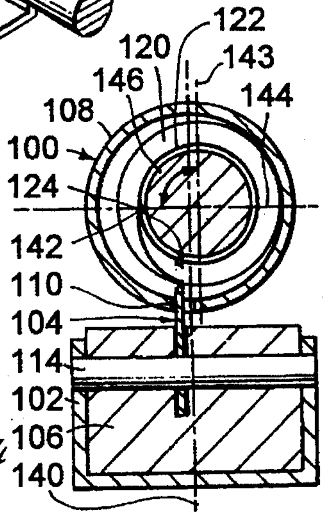
FIG. 4 is a front plan view of a grip receiving end of a grip removing device according to the present invention with the sheath in a lowered position.

In the preferred embodiment, the cutting member 104 is positioned such that the cutting surface 132 (see, e.g., FIG. 5) of the cutting member 104 is oriented to be "substantially perpendicular" to a golf club shaft in use. By "substantially perpendicular," it is meant (and is important) that the cutting surface 132 of the cutting member 104 is positioned such that when in use, it penetrates into the grip of such a golf club substantially to the shaft of the golf club to cut a slit in the grip, but does not cut totally through the grip to remove a portion of the grip during the cutting action. This limited cutting depth is believed to minimize the required force for cutting and improve overall cutting efficiency. As shown in FIG. 1 and FIG. 4, in the preferred embodiment, the cutting member 104 is a blade that is vertically disposed such that the cutting member 104 would be perpendicular to the golf club shaft if the centerline of the shaft were aligned with the blade 104 in use. As is described in greater detail below, however, in the preferred embodiment and preferred method of the present invention, the grip removal device 100 is configured so that the cutting member 104 is not positioned in alignment with the centerline of the shaft of the golf club in use, but rather is slightly offset in order to minimize the possibility for the cutting member 104 to score or damage the golf club shaft during the slitting operation.

The present invention further includes an alignment member 108 for providing guidance and alignment of a golf club shaft when the grip removing device 100 is utilized. The alignment member 108 of the grip removing device 100 may have many different configurations so long as the alignment member 108 is adapted to align a golf club shaft in the desired orientation relative to the cutting member 104 to effectively slit a golf club grip 120 in use.

In the illustrated embodiment, the alignment member 108 comprises a substantially cylindrical, grip-receiving sheath that is rotatably mounted to the base 102. The alignment member 108 is aligned with the cutting surface of the cutting member 104 so that movement of a golf club shaft within the sheath 108 causes movement of the golf grip along the cutting member 104 to effect the desired slitting motion. The sheath 108 may be connected to the base 102 by any of the number of means that will be apparent to those of ordinary skill in the art in view of the present disclosure. In the illustrated embodiment, the base 102 includes an upwardly extending channel member. The channel member and the sheath 108 are complementarily sized so that the sheath 108 fits within the channel member as shown in FIG. 1. The sheath 108 is then rotatably connected to the channel member of the base 102 by pin 116 so that the sheath 108 may be rotated into and out of a cutting position as shown in FIG. 1 and FIG. 2.

Additionally, the alignment member 108 has a length suitable to provide alignment of a golf club shaft for the full cutting operation. In a further aspect, the alignment member 108 may extend past the cutting member 104 to insure such alignment of a club in use. The alignment member 108 therefore includes a cutting member receiving slit 110 to accommodate passage of the cutting member 104 into the alignment member 108 to engage the golf club grip 120 in use. This configuration provides greater alignment and enhanced safety since the cutting member 104 remains covered for the cutting operation.

The base 102 and the alignment member 108 may be comprised of any of the number of suitable materials that will be known to those of skill in the art in view of the present disclosure. For example, the alignment member 108 and the base 102 may be comprised of machined aluminum. It will be appreciated by those of skill in the art, however, that other materials may be utilized so long as the requisite strength and functionality of the device are maintained. Within these parameters, it is believed that the particular material chosen for the grip removing device 100 is not critical.

Figure 5:
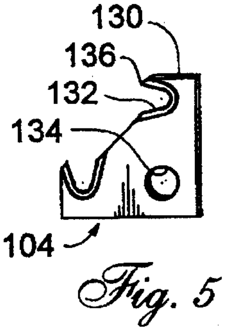
FIG. 5 is a side plan view of a blade cutting member for a grip removing device according to the present invention.

Referring now to FIG. 5, there is shown a side plan view of an embodiment of a cutting member 104, which is a hooked blade. In this embodiment, the cutting member 104 includes a noncutting top surface 130 and a lateral cutting surface 132. Cutting member 104 also includes a screw receiving hole 134. Additionally, cutting member 104 is generally planar (for insertion into the slit in receiving plate 106), and may be provided with two cutting surfaces 132 (as shown in FIG. 5) so that cutting member 104 may be rotated to use the second cutting member surface when the first becomes dull or damaged. Further, cutting member 104 may be shaped to provide a guide-tip 136 that may be easily fit under the lip 124 formed between a grip 120 and a shaft 122. Top surface 130 may be a noncutting surface to avoid unnecessary damage to shaft 122. Cutting member 104, however, may have a variety of configurations or structures as long as it provides an adequate lateral cutting surface for engaging and slitting a grip in use. For example, cutting member 104 may also be a straight razor-blade cutting member with a triangularly shaped tip, having a lateral cutting edge on one face. Cutting members that may be used are available from Golfsmith International, Inc. under Stock No. 853R (straight cutting members) and Stock No. 8533 (hooked cutting members).

FIG. 4 is a from plan view of a grip receiving end of grip removing device 100. As shown in FIG. 4, base 102 and alignment member 108 may be positioned in vertical alignment along their respective center-lines, as represented by common center-line 140. In one aspect of the present invention, cutting member 104 may be off-set from center-line 140 of base 102 and alignment member 108 such that cutting member 104 receives grip 120 at a position offset from the center-line 143 of shaft 122. This off-set is advantageous because it reduces the potential of damage to shaft 120. The degree of off-set between the cutting member 104 and the center-line 140 of the alignment member 108, the structure of the alignment member 108, the distance to which the cutting member 104 extends above the bottom side wall of the alignment member 108, and the diameter of alignment member 108 may be adjusted so that cutting member 104 engages grip 120 at a variety of different locations relative to center-line 143 of shaft 122 and grip 120.

To add flexibility, cutting member 104 may be adjustably secured to base 102 such that the degree of off-set between cutting member 104 and center-line 140 of alignment member 108 may be adjusted as desired by the user. Accordingly, the golf clubs with differing diameters for the shaft 122 and the grip 120 may easily be accommodated.

As shown in FIG. 4, with respect to a substantially cylindrical sheath alignment member 108, cutting member 104 forces the grip 120 and the shaft 122 of the butt end of a golf club against one side-wall of the substantially cylindrical sheath alignment member 108. The off-set of cutting member 104 from center-line 140 of alignment member 108, as shown in FIG. 4, is relatively small, and the inner diameter of alignment member 108 is larger than the outer diameter of shaft 122 and grip 120. As can be seen in FIG. 4, enlarging the inner diameter of the alignment member 108 would cause the shaft 122 and the grip 120 to be forced further to the side when they engage with the cutting member 104, and center-line 143 of the shaft 122 would be displaced further from the center-line 140 of the alignment member 108. Similarly, modifying the height and position of cutting member 104 will cause the cutting member 104 to engage the grip 120 at differing distances from the center-line 143 of the shaft 122. For example, the alignment member 108 and cutting member 104 may be configured so that cutting member 104 engages grip 120 and shaft 122 at engaging point 142. Line 144 represents a perpendicular line to center-line 140 of shaft 122, and angle 146 is, therefore, 90°. As would be evident to one of skill in the art from this disclosure, further variations on this structure are possible to provide varying degrees of off-set between cutting member 104, center-line 140 of alignment member 108, and center-line 143 of shaft 122 and grip 120 as desired.

The present invention also comprises a method for removing a golf grip from a golf club. Referring again to FIG. 1, FIG. 2, FIG. 3 and FIG. 4, the operation of grip removing device 100 is shown. The operator first inserts the butt end of a golf club into alignment member 108 as shown in FIG. 1. This is the grip receiving end of grip removing device 100. Alignment member 108 may have sufficient length to receive all of grip 120 or may be provided to only receive part of grip 120. Base 102 is preferably of sufficient length to allow grip 120 to easily fit between cutting member 104 and the back end of grip removing device 100.

Figure 3:
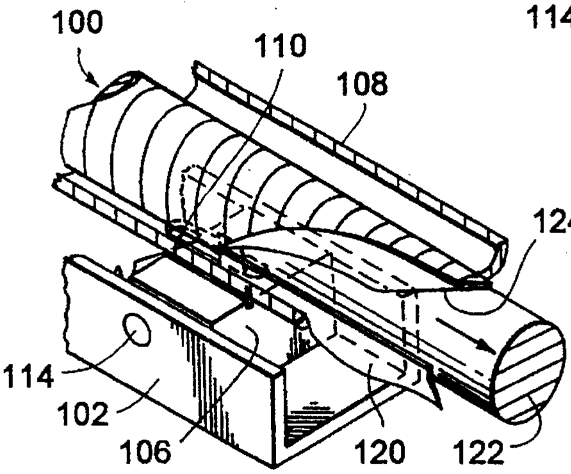
FIG. 3 is a top, right perspective view of the grip receiving end of a grip removing device according to the present invention, with the sheath in a lowered position.

Once inserted, the golf club is lowered to the mountable base 102 in the alignment member 108, as shown in FIG. 2. Cutting member 104 pushes the butt end of the golf club to the side of alignment member 108, if substantially cylindrical as shown in FIG. 4. The golf club is then pulled from alignment member 108, while applying pressure against cutting member 104, so that the cutting member 104 engages grip 120 as shown in FIG. 2 to cut a longitudinal slit into grip 120. When completed, grip 120 may be peeled off of shaft 122, as shown in FIG. 3. In operation, alignment member 108 stabilizes the golf club, facilitates positioning of the grip 120 with respect to cutting member 104, retains the golf club in relative position with cutting member 104, and protects the operator from cutting member 104. If cutting member 104 includes a guide-tip 136, the guide-tip 136 slips beneath and receives the lip 124 of the grip 120 to initiate the engagement of the grip 120 with the cutting surface 132 of the cutting member 104.

It should be noted that in an alternative embodiment, alignment member 108 may be mounted to a fixed work surface instead of base 102. In this embodiment, the base 102 and cutting member 104 are movably mounted to the alignment member 108. In such an embodiment, the butt end of the golf club is first inserted into alignment member 108. Then the base 102 is lowered and the cutting member 104 positioned so that the cutting member 104 engages the grip 120.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A golf grip slitting device to facilitate the removal of a grip from a shaft of a golf club, comprising:

an elongated mountable base securable to a work surface, said elongated mountable base comprising a U-shaped member and having a front and a back portion;

a cutting member having a grip slitting top portion and a mounting bottom portion, said mounting bottom portion coupled to said mountable base adjacent said front portion of said mountable base, and said grip slitting top portion extending upward in a substantially perpendicular direction to said elongated mountable base and engaging a grip of a golf club along a single longitudinal line in operation; and an elongated tubular alignment member sized to fit within said U-shaped member having a grip-receiving front portion with a grip-receiving opening and a back portion, said back portion rotatably coupled to said back portion of said mountable base, and said grip-receiving front portion movable in an upward direction in alignment with said substantially perpendicular direction that said slitting top portion of said cutting member extends, and movable to guide a golf club in operation to said slitting top portion of said cutting member.

2. A golf grip slitting device of claim 1, wherein said cutting member and said alignment member cooperate to position said cutting member in an offset alignment with a center-line of said golf club in use.

3. A golf grip slitting device of claim 2, wherein said alignment member is a substantially cylindrical, elongated sheath.

4. A golf grip slitting device of claim 3, wherein said alignment member extends over said curing member and has a cutting member receiving slit.

5. A golf grip slitting device of claim 1, further comprising a plurality of mounting screws coupled to said mountable base.

6. A golf grip slitting device of claim 1, further comprising a work surface, said mountable base being rigidly coupled to said work surface.

7. A golf grip slitting device of claim 1, wherein said cutting member has a noncutting top surface.

8. A golf grip slitting device of claim 7, wherein said noncutting top surface and a lateral cutting surface define a guide-tip to receive a lip of said grip in use.

9. A golf grip slitting device of claim 8, wherein said cutting member is a hooked blade.

10. The golf grip slitting device of claim 1 further comprising a fixing plate coupled to said mountable base adjacent said front portion of said mountable base and coupled to said mounting portion of said cutting member.

11. The golf grip slitting device of claim 1, wherein said back portion of said alignment member is coupled to said back portion of said mountable base with a pin arrangement.

12. The golf grip slitting device of claim 1, wherein said mountable base, said cutting member and said alignment member are aluminum.

* * * * *

UNITED STATES PATENT AND TRADEMARK OFFICE
CERTIFICATE OF CORRECTION

PATENT NO. : 5,636,560

DATED : June 10, 1997

INVENTOR(S) : Carl F. Paul

It is certified that error appears in the above-identified patent and that said Letters Patent is hereby corrected as shown below:

Title page, item [56], line 5, delete "7/1939" and insert -- 7/1937 -- therefor.

Title page, item [56], line 1, delete"1/1949" and insert -- 10/1949 -- therefor.

In claim 4, column 8, line 16, delete "curing" and insert -- cutting -- therefor.

Signed and Sealed this

Twenty-eighth Day of October, 1997

Attest:

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,636,560

DATED : June 10, 1997

INVENTOR(S) : Carl F. Paul

It is certified that error appears in the above-identified patent and that said Letters Patent is hereby corrected as shown below:

Title page, item [56], line 4, insert -- 0005222 1/1983 Japan 30 90.4 -- therefor.

Signed and Sealed this

Twenty-fourth Day of March, 1998

Attest:

BRUCE LEHMAN

*Attesting Officer*

*Commissioner of Patents and Trademarks*